(12) United States Patent
You et al.

(10) Patent No.: US 11,930,408 B2
(45) Date of Patent: Mar. 12, 2024

(54) TIMER-BASED PROCESSING METHOD, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Xin You, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 475 days.

(21) Appl. No.: 17/207,373

(22) Filed: Mar. 19, 2021

(65) Prior Publication Data
US 2021/0211950 A1    Jul. 8, 2021

Related U.S. Application Data

(63) Continuation of application No. PCT/CN2018/108090, filed on Sep. 27, 2018.

(51) Int. Cl.
*H04W 36/00* (2009.01)
*H04W 24/10* (2009.01)
(Continued)

(52) U.S. Cl.
CPC ....... *H04W 36/0061* (2013.01); *H04W 24/10* (2013.01); *H04W 36/0058* (2018.08); *H04W 76/19* (2018.02); *H04W 76/30* (2018.02)

(58) Field of Classification Search
CPC .............................. H04W 76/27; G08B 25/009
(Continued)

(56) References Cited

U.S. PATENT DOCUMENTS 8,588,697 B1 * 11/2013 Vargantwar ........... H04W 76/38
                                                                                455/452.2
2008/0051091 A1    2/2008 Phan et al.
(Continued)

FOREIGN PATENT DOCUMENTS

CN    102144417    8/2011
CN    102769849    11/2012
(Continued)

OTHER PUBLICATIONS

Qualcomm Incorporated, "Discussion on Make-Before-Break Handover," 3GPP TSG-RAN2 Meeting #95bis, R2-167133, Oct. 2016.

(Continued)

*Primary Examiner* — Kiet M Doan
(74) *Attorney, Agent, or Firm* — Hodgson Russ LLP

(57) ABSTRACT

A timer-based processing method, a terminal device, and a computer-readable storage medium are provided. The method includes the following. Obtain a first timer of a source network device. Monitor a connection between the terminal device and the source network device based on the first timer of the source network device, in response to the terminal device connecting to a target network device. The method further includes the following. During monitoring the source network device based on the first timer of the source network device, start the first timer of the source network device in response to a starting condition of the first timer being met, stop the first timer of the source network device in response to a stopping condition of the first timer being met, or the first timer of the source network device expires in response to elapse of timing time of the first timer.

14 Claims, 5 Drawing Sheets

(51) Int. Cl.
*H04W 76/19* (2018.01)
*H04W 76/30* (2018.01)

(58) Field of Classification Search
USPC .................................. 370/252, 328; 455/436
See application file for complete search history.

(56) References Cited

U.S. PATENT DOCUMENTS

| | | | | |
|---|---|---|---|---|
| 2009/0239545 | A1* | 9/2009 | Lee | H04W 74/002 |
| | | | | 455/450 |
| 2015/0126198 | A1 | 5/2015 | Wang et al. | |
| 2015/0296418 | A1 | 10/2015 | Szilagyi et al. | |
| 2016/0174124 | A1 | 6/2016 | Basu Mallick et al. | |
| 2018/0132300 | A1 | 5/2018 | Viering et al. | |
| 2019/0132808 | A1* | 5/2019 | Tsuboi | H04W 76/27 |
| 2021/0243809 | A1* | 8/2021 | Uchino | H04W 74/0833 |

FOREIGN PATENT DOCUMENTS

| | | |
|---|---|---|
| CN | 103974452 | 8/2014 |
| CN | 107371208 | 11/2017 |
| CN | 107690162 | 2/2018 |
| CN | 107809778 | 3/2018 |
| KR | 20100087353 A | 8/2010 |
| KR | 20150039068 A | 4/2015 |
| KR | 20170091618 A | 8/2017 |
| WO | 2010151089 | 12/2010 |
| WO | 2016090124 | 6/2016 |
| WO | 2016198098 | 12/2016 |
| WO | 2017163670 | 9/2017 |
| WO | 2018024212 | 2/2018 |

OTHER PUBLICATIONS

EPO, Communication for EP Application No. 18935689.2, dated Jan. 13, 2022.
IPI, Office Action for IN Application No. 202117011798, dated Feb. 2, 2022.
Intel Corporation, "New WID: NR mobility enhancements," 3GPP TSG RAN Meeting #80, RP-181433, May 2018, 5 pages.
"3rd Generation Partnership Project; Technical Specification Group Radio Access Network; NR; NR and NG-RAN Overall Description; Stage 2 (Release 15)," 3GPP TS 38.300, Jun. 2018, v15.2.0, 87 pages.
"3rd Generation Partnership Project; Technical Specification Group Radio Access Network; NR; Radio Resource Control (RRC) protocol specification (Release 15)," 3GPP TS 38.331, Jun. 2018, v15.2.0, 304 pages.
Telecompedia, "LTE RRC Timers and Constants," 3GPP 366.331, 2021, retrieved from the internet: <https://telecompedia.net/lte-rrc-timers-and-constants/>.
WIPO, International Search Report and Written Opinion for PCT/CN2018/108090, dated Jun. 13, 2019.
CNIPA, Second Office Action for CN Application No. 202110406079.8, dated Nov. 7, 2022.
TIPO, Office Action for TW Application No. 108134951, dated Nov. 7, 2022.
ZTE Corporation et al., "Discussion on single connected handover," 3GPP TSG-RAN WG2 Meeting #101, R2-1802021 (revision of R2-1800438), Feb. 2018, 5 pages.
Astri et al., "Discussion on Conditional Handover in NR," 3GPP TSG-RAN WG2 Meeting #101, R2-1802008 (Resubmission of R2-1800663), Feb. 2018, 6 pages.
EPO, Extended European Search Report for EP Application No. 18935689.2, dated Jul. 30, 2021.
JPO, Office Action for JP Application No. 2021-516808, dated Jul. 5, 2022.
CNIPA, First Office Action for CN Application No. 202110406079.8, dated May 26, 2022.
CNIPA, Rejection Decision for CN Application No. 202110406079.8, dated Mar. 17, 2023.
TIPO, Office Action for TW Application No. 108134951, dated Mar. 13, 2023.
Ericsson, "Mobility Enhancements in NR," 3GPP TSG-RAN WG2 NR AH#1801, Tdoc R2-1801332 (resubmission of R2-1713914), Jan. 2018.
EPO, Extended European Search Report for EP Application No. 22211220.3, dated Mar. 14, 2023.
KIPO, Office Action for KR Application No. 10-2021-7009402, dated Feb. 10, 2023.
Intel Corporation, "NW controlled autonomous handover in single connectivity," 3GPP TSG RAN WG2 Meeting #97, R2-1701711, Feb. 13-17, 2017, Athens, Greece.
Intel Corporation, "NW controlled autonomous handover," 3GPP TSG RAN WG2 Meeting #97bis, R2-1703414, Apr. 3-7, 2017, Spokane, USA.
KIPO, Notice of Allowance issued for KR Application No. 10-2021-7009402, dated Aug. 9, 2023.
IPIN, Hearing Notice issued for IN Application No. 202117011798, dated Aug. 2, 2023.

* cited by examiner

Configure, for a terminal device, a first timer of a source network device  /401
FIG. 4
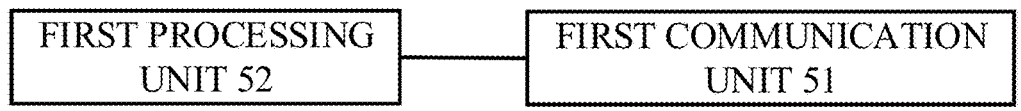
FIG. 5
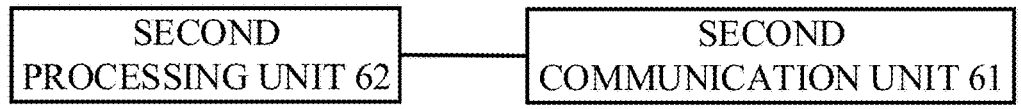
FIG. 6

TIMER-BASED PROCESSING METHOD, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2018/108090, filed on Sep. 27, 2018, the entire disclosure of which is incorporated herein by reference.

TECHNICAL FIELD

The present disclosure relates to the technical field of information processing, and in particular, to a timer-based processing method, a terminal device, and a non-transitory computer-readable storage medium.

BACKGROUND

In mobile communication processing, handover failure may occur during a handover process. General reasons for handover failure are T304 timeout, T307 timeout, T312 timeout, etc. In the handover process, in response to reception of a handover command, a terminal device disconnects from a source network device, for example, disconnects from a source base station, and T310 and T312 will stop. In other handover processes that may occur, it may be necessary to still maintain monitoring of link quality of the source network device. However, at present there is no relevant solution of monitoring the source network device.

SUMMARY

Implementations of the present disclosure provide a timer-based processing method, a terminal device, and a non-transitory computer-readable storage medium.

According to a first aspect, implementations of the present disclosure provide a timer-based processing method. The method is applied to a terminal device and includes the following. Obtain a first timer of a source network device. Monitor a connection between the terminal device and the source network device based on the first timer of the source network device, in response to the terminal device connecting to a target network device. The method further includes one of the following. During monitoring the source network device based on the first timer of the source network device, start the first timer of the source network device in response to a starting condition of the first timer being met, stop the first timer of the source network device in response to a stopping condition of the first timer being met, and the first timer of the source network device expires in response to elapse of timing time of the first timer.

According to a second aspect, implementations of the present disclosure provide a terminal device. The terminal device includes at least one processor and a memory storing computer programs which, when executed by the processor, cause the at least one processor to perform the following. Obtain a first timer of a source network device. Monitor a connection between the terminal device and the source network device based on the first timer of the source network device, in response to the terminal device connecting to a target network device. The method further includes one of the following. During monitoring the source network device based on the first timer of the source network device, start the first timer of the source network device in response to a starting condition of the first timer being met, stop the first timer of the source network device in response to a stopping condition of the first timer being met, and the first timer of the source network device expires in response to elapse of timing time of the first timer.

According to a third aspect, a non-transitory computer-readable storage medium is provided. The storage medium stores computer programs which, when executed by at least one processor, cause the at least one processor to perform the following. Obtain a first timer of a source network device. Monitor a connection between the terminal device and the source network device based on the first timer of the source network device, in response to the terminal device connecting to a target network device. During monitoring the source network device based on the first timer of the source network device, start the first timer of the source network device in response to a starting condition of the first timer being met, stop the first timer of the source network device in response to a stopping condition of the first timer being met, and the first timer of the source network device expires in response to elapse of timing time of the first timer.

BRIEF DESCRIPTION OF THE DRAWINGS

FIG. 4 is a schematic flow chart illustrating a timer-based processing method according to an implementation of the present disclosure.

FIG. 5 is a schematic structural diagram illustrating a terminal device according to an implementation of the present disclosure.

FIG. 6 is a schematic structural diagram illustrating a network device according to an implementation of the present disclosure.

DETAILED DESCRIPTION

The technical solutions in implementations of the present disclosure will be described in the following with reference to the accompanying drawings in the implementations of the present disclosure. Apparently, the described implementations are merely a part of rather than all the implementations of the present disclosure. All other implementations obtained by those of ordinary skill in the art based on the implementations of the present disclosure without creative efforts are within the scope of the present disclosure.

The technical solutions in the implementations of the present disclosure can be applied to various communication systems, such as a global system of mobile communication (GSM), a code division multiple access (CDMA) system, a wideband code division multiple access (WCDMA) system, general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a fifth generation (5G) system, or the like.

Figure 1:
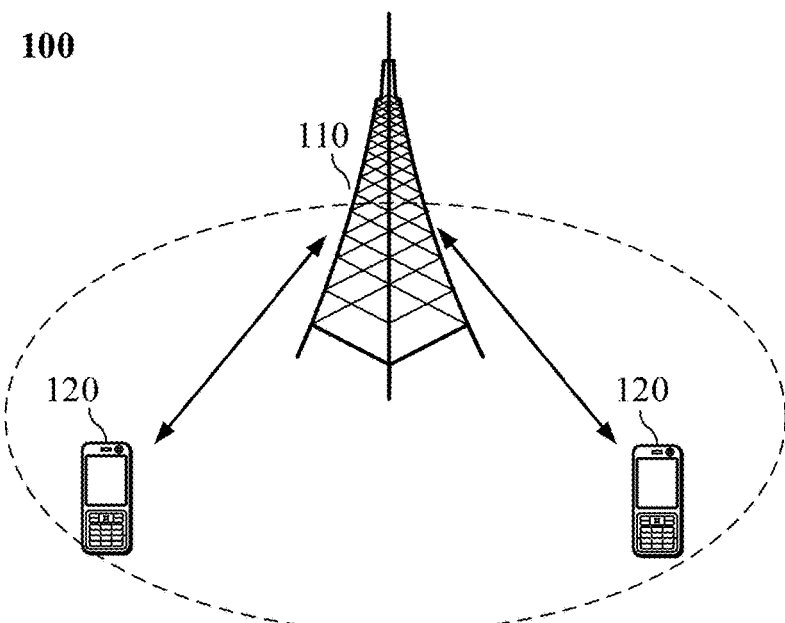
FIG. 1 is a schematic diagram illustrating a communication system architecture according to an implementation of the present disclosure.

For example, a communication system 100 in an implementation of the present disclosure is illustrated in FIG. 1. The communication system 100 may include a network device 110. The network device 110 can communicate with a terminal 120 (or called a communication terminal or a terminal). The network device 110 can provide communication coverage for a specific geographic area and communicate with terminals in the coverage area. In an implementation, the network device 110 may be a network device (base transceiver station, BTS) in the GSM or CDMA system, a network device (NodeB, NB) in the WCDMA system, an evolutional network device (evolutional node B, eNB or eNodeB) in the LTE system, or a wireless controller in a cloud radio access network (CRAN). In an implementation, the network device 110 may be a mobile switch center, a relay station, an access point, a vehicle-mounted device, a wearable device, a hub, a switch, a network bridge, a router, a network device in the 5G network, a network device in a future evolution public land mobile network (PLMN), or the like The communication system 100 further includes at least one terminal device 120 in the coverage area of the network device 110. The "terminal device" used herein may include but is not limited to a device coupled via a wired line, and/or other data connection/network, and/or a wireless interface, and/or a device communicating with another terminal device to receive/transmit communication signals, and/or an Internet of Things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via the wireless interface may be called a "wireless communication terminal", a "wireless terminal", or a "mobile terminal". Examples of a mobile terminal may include, but are not limited to, a satellite or cellular telephone, a personal communication system (PCS) terminal integrated with functions of cellular radio telephone, data processing, fax, and data communication, a personal digital assistant (PDA) equipped with radio telephone, pager, Internet/Intranet access, web browsing, a notebook, a calendar, and/or a global positioning system (GPS) receiver, and a conventional laptop and/or a handheld receiver or other electronic devices equipped with a radio telephone transceiver. The terminal device may refer to an access terminal, user equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with a wireless communication function, a computing device or other processing devices coupled with wireless modems, a vehicle-mounted device, a wearable device, a terminal device in the 5G network or the future evolution PLMN, or the like.

In an implementation, the terminals 120 may communication with each other through device to device (D2D) communication.

In an implementation, the 5G system or 5G network may also be referred to as a new radio (NR) system or an NR network.

As an example, FIG. 1 illustrates a network device and two terminal devices. In an implementation, the communication system 100 may include multiple network devices, and in a coverage area of each network device, there can be other numbers of terminal devices, which is not limited herein.

In an implementation, the communication system 100 may further include a network controller, a mobility management entity (MME), or other network entities, which is not limited herein.

It is to be understood that in the implementation of the present disclosure, in a network/system, a device with a communication function can be called a communication device. The communication system 100 illustrated in FIG. 1 is taken as an example. The communication devices may include the network device 110 and the terminal device 120 that have a communication function. The network device 110 and the terminal device 120 may be the devices described above, which is not repeated herein. The communication devices may further include other devices in the communication system 100, such as the network controller, the MME, or other network entities, which is not limited herein.

It is to be understood that the terms "system" and "network" in the specification are often used interchangeably in the specification. The term "and/or" in the specification is only a description of an association relationship of associated objects, which means that there may be three relationships, for example, A and/or B, which may mean that: A exists alone, A and B both exist, and B exists alone. In addition, the character "/" in the specification generally means that an object before "/" and an object after "/" are in an "or" relationship.

In order to understand the characteristics and technical contents of the implementations of the present disclosure in detail, the implementations of the present disclosure will be described in detail below with reference to the accompanying drawings. The attached accompanying drawings are for reference only and not used to limit the implementations of the present disclosure.

First Implementation

Figure 2:
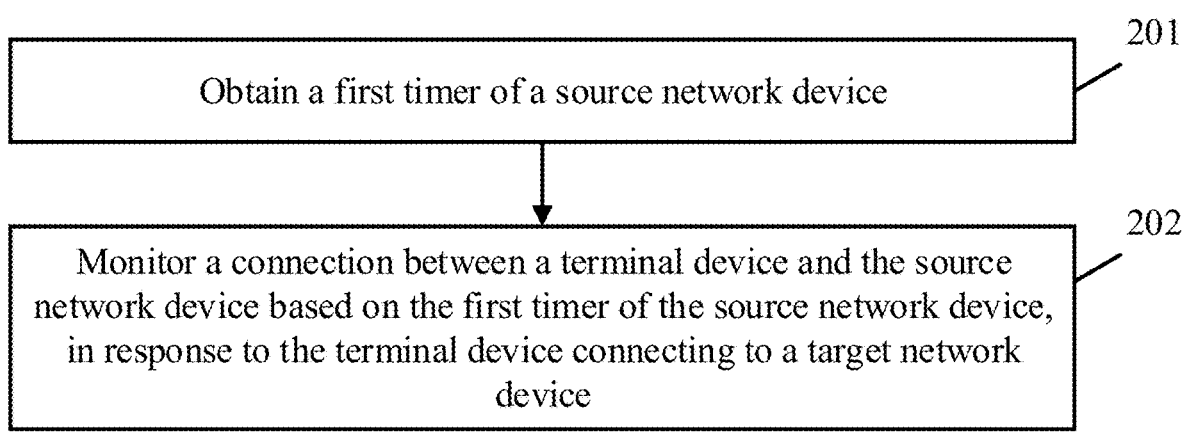
FIG. 2 is a schematic flow chart illustrating a timer-based processing method according to an implementation of the present disclosure.

FIG. 2 illustrates a timer-based processing method according to an implementation of the present disclosure. The method is applied to a terminal device and includes the following.

At block 201, obtain a first timer of a source network device.

At block 202, in response to the terminal device connecting to a target network device, monitor a connection between the terminal device and the source network device based on the first timer of the source network device.

During monitoring the source network device based on the first timer of the source network device, the method further includes one of the following. In response to a starting condition of the first timer being met, start the first timer of the source network device. In response to a stopping condition of the first timer being met, stop the first timer of the source network device. In response to elapse of timing time of the first timer, the first timer of the source network device expires.

What needs to be illustrated is that during the terminal device connecting to the network device, the connection between the terminal device and the source network device can still be maintained.

The starting condition of the first timer includes one of: reception of a handover (HO) command for the target network device or reception of a physical-layer asynchronous indication.

In an implementation, in response to reception of the HO command, start the first timer. At this point, T312 and T310 can be run.

In an implementation, in response to reception of one physical-layer asynchronous indication or at least two physical-layer asynchronous indications, determine to start the first timer. For example, when one physical-layer asynchronous indication is received, determine to start the first timer.

In other implementations, when at least two physical-layer asynchronous indications are successively received, that is to say, when at least two physical-layer asynchronous indications are successively received within a certain time, determine to start the first timer. It can also be understood that it is also possible to set a threshold for the number of physical-layer asynchronous indications successively received. For example, it can be set that start the first timer when eight physical-layer asynchronous indications are successively received, and other numbers can be set, which will be not exhaustively illustrated herein. For example, when multiple physical-layer asynchronous instructions are successively received, start the timer. At this point, T312 and T310 may not be run. The certain time can be set according to actual conditions, for example, the certain time can be 40 ms or other values, and can be determined according to network conditions or current network load, which is not limited herein.

The HO command can be transmitted by the source network device. In addition, when multiple physical-layer asynchronous indications are successively received, it can be considered that the current network connection is relatively poor.

The stopping condition of the first timer includes one of: reception of a physical-layer synchronous indication, the terminal device connecting to the target network device successfully, releasing the connection between the terminal device and the source network device, or reception of a network indication of releasing the connection between the terminal device and the source network device.

When one physical-layer synchronous indication or at least two physical-layer synchronous indications are received, determine to stop the first timer. For example, when one physical-layer synchronous indication is received, determine to stop the first timer.

In can be considered that at least two physical-layer synchronous indications refer to at least two physical-layer synchronous indications successively received, that is to say, at least two physical-layer synchronous indications are successively received within a certain time. It can also be understood that it is also possible to set a threshold for the number of physical-layer synchronous indications successively received. For example, it can be set that stop the first timer when eight physical-layer synchronous indications are successively received, and other numbers can be set, which will be not exhaustively illustrated herein. When multiple physical-layer synchronous indications are successively received, it can be considered that quality of signals between the terminal device and the target network device is relatively high. The certain time can be set according to actual conditions, for example, the certain time can be 40 ms or other values, and can be determined according to network conditions or current network load, which is not limited herein.

In addition, a time point at which the terminal device successfully connects to the target network device and a time point at which the terminal device releases the connection with the source network device may be the same or different, that is, when the terminal device successfully connects to the target network device, the first timer can be controlled to stop, and at this point, stop monitoring the source network device, or when it is determined to release the connection between the terminal device and the source network device, the first timer can be stopped, that is, stop monitoring the source network device. When the two time points are different, it may be that the time point at which the terminal device releases the connection with the source network device is later than the time point at which the terminal device successfully connects to the target network device, which can be understood as after the terminal device successfully connects to the target network device, release the connection with the source network device.

Furthermore, reception of the network indication of releasing the connection with the source network device may refer to reception of a connection-release indication from the target network device, or reception of a connection-release indication from a network side. At this point, the first timer of the source network device can be stopped.

What needs to be pointed out is that monitoring the source network device may refer to detecting quality of signals from the source network device. With the first timer, time taken for monitoring the source network device can be controlled.

In response to expiry of the first timer of the source network device, the method further includes one of the following. The terminal device initiates radio resource control (RRC) connection re-establishment. The terminal device returns to idle status. The terminal device disconnects from the source network device.

In an implementation, when the first timer expires, it can be considered that the terminal device unsuccessfully connects to the target network device. At this point, the RRC connection re-establishment can be performed. At this point, the terminal device does not need to establish the connection with the source network device, and can establish a connection with other network devices, which will not be exhaustively illustrated herein. In other implementations, at this point, the terminal device returns to the idle status, or directly disconnects from the source network device. In addition, before the first timer expires, the terminal device can attempt to connect to the target network device multiple times, and in case that the terminal device successfully connects to the target network device every time, perform the aforementioned processing when the first timer expires.

Based on the foregoing solution, in the implementation, obtaining the first timer of the source network device includes obtaining the first timer configured by the network side.

The network side can configure the first timer for the terminal device through RRC signaling and system messages. The network side configuring the first timer for the terminal device can be that the network side (such as evolved universal terrestrial radio access (E-UTRA)) or the network device (such as the source network device) configures the first timer for the terminal device.

In other implementations, the first timer can be obtained from the HO command, that is, the terminal device receives the HO command from the network side and obtains the first timer from information carried in the HO command.

The HO command can be transmitted by the source network device. In this scenario, the terminal device receives the HO command from the source network device, and obtains the first timer from a reconfiguration message in the HO command.

Figure 3:
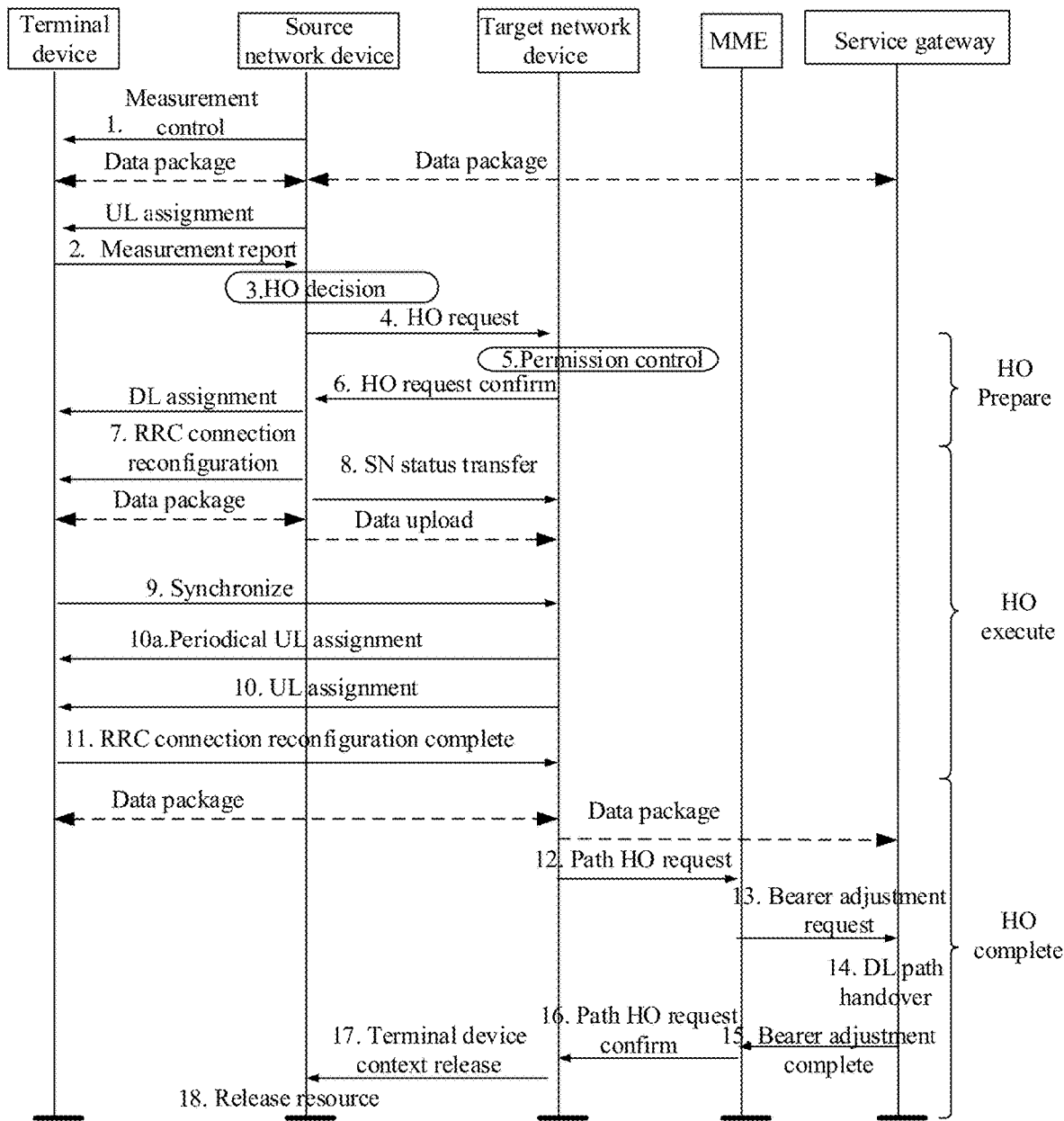
FIG. 3 is a schematic diagram illustrating a handover processing scenario according to an implementation of the present disclosure.

FIG. 3 illustrates HO command transmission and information interaction during a handover process.

A handover preparation phase includes operations at steps 1-6 in FIG. 3. The source network device transmits measurement control to the terminal device. After the terminal device performs measurement on multiple network devices or cells, the terminal device transmits a measurement report to the source network device. The source network device determines a handover decision according to the measurement report (or combined with radio resource management (RRM) information). The source network device transmits a handover request to the target network device to enable the target network device to be ready to perform handover. The target network device performs handover permission control according to the handover request. When the target network device determines to perform handover, the target network device transmits a handover request confirmation to the source network device.

Then proceed to a handover execution phase, including operations at steps 7-11 in FIG. 3. The target network device generates RRC information, transmits the RRC connection reconfiguration information to the source network device, and the source network device transmits the RRC connection reconfiguration information to the terminal device. Upon reception of the RRC connection reconfiguration information, the terminal device performs handover processing according to the RRC connection reconfiguration information. The source network device then transmits a sequence number (SN) status transfer message to the target network device. The terminal device synchronizes with the target network device, receives an uplink (UL) assignment message from the target network device, and transmits an RRC connection reconfiguration completion message to the target network device.

Finally, enter a handover completion stage, including operations at steps 12-18 in FIG. 3. The target network device transmits a path handover request to an MME to notify the MME terminal equipment to perform cell change. The MME transmits a bearer adjustment request to a service gateway, and the service gateway performs a downlink path handover processing. After the service gateway completes the processing, the service gateway transmits a bearer adjustment completion message to the MME, and the MME transmits a confirmation message for the path handover request to the target network device. The target network device notifies the source network device of terminal device context release and the source network device releases resources.

Further, in the implementation, the terminal device retains the connection with the source network device. The terminal device retains a first protocol stack and a first related key between the terminal device and the source network device, and maintains a second protocol stack and a second related key between the terminal device and the target network device. The first related key is different from the second related key. The second related key can be generated according to the first related key.

The first protocol stack and the second protocol stack may be the same or different, or at least partially different. For example, for a 5G system, a service data adaption protocol (SDAP), a packet data convergence protocol (PDCP), a radio link control (RLC) protocol, a media access control (MAC) entity, and a lower layer entity maintained between the terminal device and the source network device may be different from those maintained between the terminal device and the target network device. For a fourth generation (4G) system, a PDCP, an RLC protocol, an MAC entity, and a lower layer entity maintained between the terminal device and the source network device may be different from those maintained between the terminal device and the target network device. In addition, according to the technical solution in the implementation, to ensure usage of different keys, the PDCP in the first protocol stack needs to be different from the PDCP in the second protocol stack. In the first protocol stack and the second protocol stack, SDAPs, RLC protocols, MAC entities, and/or physical layers may be the same or different. In other implementations, the first protocol stack and the second protocol stack can share the same SDAP, and/or the same RLC protocol, and/or the same MAC entity, and/or the same physical layer, or have their respective SDAPs, RLCs, MAC entities, and physical layers.

The target network device in the implementation refers to the target network device to which the terminal device is ready to switch to connect. In another implementation, the target network device is a secondary node (SN), and the source network device is a master node (MN). It should be noted that in an LTE system, the SN is called a secondary cell group (SCG), and in an NR system it is the SN, which refers to the same concept, that is, the SN is a second service network device in a dual connectivity (DC) scenario. In the implementation, applicable scenarios may include the following: the terminal device maintains the connection with the source network device and fails to connect to the target network device; the terminal device disconnects from the source network device and successfully connects to the target network device; and/or the terminal device fails to connect to an SCG and SCG connection change fails. Of course, there may also be other scenarios, for example, in a scenario where multiple SCGs are configured, fail to connect to one SCG, and in a scenario where multiple target cells are configured, fail to connect to one target cell. There may also be other applicable scenarios, which will not be exhaustively illustrated in the implementation.

Finally, the timing time of the first timer is explained as follows. The timing time of the first timer is the same as that of T310 or T312. In another implementation, the timing time of the first timer is related to average time taken for that the terminal device accesses the target network device.

The average time taken for that the terminal device accesses the target network device can be calculated based on only time taken for multiple accesses from the terminal device to different target network devices or the same target network device within a period of time. The period of time can be set according to actual conditions, for example, can set to be 1 day or 10 days, etc., which will be not exhaustively illustrated herein. Of course, the average time taken for that the terminal device accesses the target network device can also be calculated based on time taken for the last N accesses from the terminal device to the target network device, for example, based on only the last 10 accesses from the terminal device to the target network device. The average time calculated can be used as the timing time of the first timer. In other implementations, a sum of the average time and M can be used as the timing time of the first timer, where M can be set according to actual situations and can also be set to be a constant, which is not limited herein.

The first timer provided in the implementation may be a newly defined timer that is different from existing timers, for example, different from existing T310, T312, T304, and T307.

In addition, the first timer may be T310 or T312, and what is needed is to adjust T310 or T312. At present, timing of T310 and 312 are illustrated in the following table.

| Timer | Start | Stop | Expire |
|---|---|---|---|
| T312 | Receive a measurement report; and T310 is run. | Receive lower layer synchronous indications successively; receive an HO command; trigger a connection re-establishment procedure; and T310 expires. | Return to idle status; and perform connection re-establishment. |
| T310 | Receive physical-layer asynchronous indications successively. | Receive physical-layer synchronous indications successively; receive an HO command; and trigger a connection re-establishment procedure | Perform RRC connection re-establishment; and return to idle status. |

The above T310 or T312 subjected to an operation of modifying the stopping condition can be used as the first timer in the implementation. For example, by removing the stopping condition of "receive an HO command" in the above table, T310 or T312 can be used as the aforementioned first timer in the implementation.

Furthermore, what needs to be illustrated is that based on the adjusted T310 or T312, the first timer is not interrupted upon reception of the HO command. In addition, based on the adjusted T310 or T312, the first timer can be re-started upon reception of the HO command.

It can be seen that by adopting the above solution, the first timer for the terminal device can be configured. When the terminal device performs a handover connection to connect to the target network device, the terminal device still maintains the connection with the source network device. At this point, monitor the source network device based on the first timer. In this way, while maintaining dual connection, i.e., the connection between the terminal device and the source network device and the connection between the terminal device and the target network device, the first timer for the terminal device can be provided to monitor the source network device, thereby ensuring that the solution can be applied to various processing scenarios.

Second Implementation

FIG. 4 illustrates a timer-based processing method according to an implementation of the present disclosure. The method is applied to a source network device and includes the following.

At block 401, configure, for a terminal device, a first timer of the source network device.

Furthermore, after the operation at block 401, the method further includes the following. In response to the terminal device connecting to a target network device, maintain a connection between the source network device and the terminal device.

A starting condition of the first timer includes one of: reception of an HO command for the target network device or reception of a physical-layer asynchronous indication.

In an implementation, in response to reception of the HO command, start the first timer. At this point, T312 and T310 can be run.

In an implementation, in response to reception of one physical-layer asynchronous indication or at least two physical-layer asynchronous indications, determine to start the first timer. For example, when one physical-layer asynchronous indication is received, determine to start the first timer.

In other implementations, when at least two physical-layer asynchronous indications are successively received, that is to say, when at least two physical-layer asynchronous indications are successively received within a certain time, determine to start the first timer. It can also be understood that it is also possible to set a threshold for the number of physical-layer asynchronous indications successively received. For example, it can be set that start the first timer when eight physical-layer asynchronous indications are successively received, and other numbers can be set, which will be not exhaustively illustrated herein. For example, when multiple physical-layer asynchronous instructions are successively received, start the timer. At this point, T312 and T310 may not be run. The certain time can be set according to actual conditions, for example, the certain time can be 40 ms or other values, and can be determined according to network conditions or current network load, which is not limited herein.

The HO command can be transmitted by the source network device. In addition, when multiple physical-layer asynchronous indications are successively received, it can be considered that the current network connection is relatively poor.

The stopping condition of the first timer includes one of: reception of a physical-layer synchronous indication, the terminal device connecting to the target network device successfully, releasing the connection between the terminal device and the source network device, or reception of a network indication of releasing the connection between the terminal device and the source network device.

When one physical-layer synchronous indication or at least two physical-layer synchronous indications are received, determine to stop the first timer. For example, when one physical-layer synchronous indication is received, determine to stop the first timer.

In can be that at least two physical-layer synchronous indications refer to at least two physical-layer synchronous indications successively received, that is to say, at least two physical-layer synchronous indications can be successively received within a certain time. It can also be understood that it is also possible to set a threshold for the number of physical-layer synchronous indications successively received. For example, it can be set that stop the first timer when eight physical-layer synchronous indications are successively received, and other numbers can be set, which will be not exhaustively illustrated herein. When multiple physical-layer synchronous indications are successively received, it can be considered that quality of signals between the terminal device and the target network device is relatively high. The certain time can be set according to actual conditions, for example, the certain time can be 40 ms or other values, and can be determined according to network conditions or current network load, which is not limited herein.

In addition, a time point at which the terminal device successfully connects to the target network device and a time point at which the terminal device releases the connection with the source network device may be the same or different, that is, when the terminal device successfully connects to the target network device, the first timer can be controlled to stop, and at this point, stop monitoring the source network device, or when it is determined to release the connection between the terminal device and the source network device, the first timer can be stopped, that is, stop monitoring the source network device. When the two time points are different, it may be that the time point at which the terminal device releases the connection with the source network device is later than the time point at which the terminal device successfully connects to the target network device, which can be understood as after the terminal device successfully connects to the target network device, release the connection with the source network device.

Furthermore, reception of the network indication of releasing the connection between the terminal device and the source network device may refer to reception of a connection-release indication from the target network device, or reception of a connection-release indication from a network side. At this point, the first timer of the source network device can be stopped.

What needs to be pointed out is that monitoring the source network device may refer to detecting quality of signals from the source network device. With the first timer, time taken for monitoring the source network device can be controlled.

In response to expiry of the first timer of the source network device, the method further includes one of the following. The terminal device initiates RRC connection re-establishment. The terminal device returns to idle status. The terminal device disconnects from the network device.

In an implementation, when the first timer expires, it can be considered that the terminal device unsuccessfully connects to the target network device. At this point, the RRC connection re-establishment can be performed. At this point, the terminal device does not need to establish the connection with the source network device, and can establish a connection with other network devices, which will not be exhaustively illustrated herein. In other implementations, at this point, the terminal device returns to the idle status, or directly disconnects from the source network device. In addition, before the first timer expires, the terminal device can attempt to connect to the target network device multiple times, and in case that the terminal device successfully connects to the target network device every time, perform the aforementioned processing when the first timer expires.

Based on the foregoing solution, in the implementation, configure, for the terminal device, the first timer of the source network device.

The first timer can be configured for the terminal device through RRC signaling and system messages.

In other implementations, the first timer can be obtained from the HO command, that is, the source network device transmits the HO command to the terminal device, where the HO command carries the first timer.

The HO command can be transmitted from the source network device to the terminal device. In this scenario, the terminal device can receive the HO command from the source network device, and obtain the first timer from a reconfiguration message in the HO command.

FIG. 3 illustrates HO command transmission and information interaction during a handover process.

A handover preparation phase includes operations at steps 1-6 in FIG. 3. The source network device transmits measurement control to the terminal device. After the terminal device performs measurement on multiple network devices or cells, the terminal device transmits a measurement report to the source network device. The source network device determines a handover decision according to the measurement report (or combined with RRM information). The source network device transmits a handover request to the target network device to enable the target network device to be ready to perform handover. The target network device performs handover permission control according to the handover request. When the target network device determines to perform handover, the target network device transmits a handover request confirmation to the source network device.

Then proceed to a handover execution phase, including operations at steps 7-11 in FIG. 3. The target network device generates RRC information, transmits the RRC connection reconfiguration information to the source network device, and the source network device transmits the RRC connection reconfiguration information to the terminal device. Upon reception of the RRC connection reconfiguration information, the terminal device performs handover processing according to the RRC connection reconfiguration information. The source network device then transmits an SN status transfer message to the target network device. The terminal device synchronizes with the target network device, receives a UL assignment message from the target network device, and transmits an RRC connection reconfiguration completion message to the target network device.

Finally, enter a handover completion stage, including operations at steps 12-18 in FIG. 3. The target network device transmits a path handover request to an MME to notify the MME terminal equipment to perform cell change. The MME transmits a bearer adjustment request to a service gateway, and the service gateway performs a downlink path handover processing. After the service gateway completes the processing, the service gateway transmits a bearer adjustment completion message to the MME, and the MME transmits a confirmation message for the path handover request to the target network device. The target network device notifies the source network device of terminal device context release and the source network device releases resources.

Further, in the implementation, the terminal device retains the connection with the source network device. The terminal device retains a first protocol stack and a first related key between the terminal device and the source network device, and maintains a second protocol stack and a second related key between the terminal device and the target network device. The first related key is different from the second related key. The second related key can be generated according to the first related key.

The first protocol stack and the second protocol stack may be the same or different, or at least partially different. For example, for a 5G system, an SDAP, a PDCP, an RLC protocol, an MAC entity, and a lower layer entity maintained between the terminal device and the source network device may be different from those maintained between the terminal device and the target network device. For a 4G system, a PDCP, an RLC protocol, an MAC entity, and a lower layer entity maintained between the terminal device and the source network device may be different from those maintained between the terminal device and the target network device. In addition, according to the technical solution in the implementation, to ensure usage of different keys, the PDCP in the first protocol stack needs to be different from the PDCP in the second protocol stack. In the first protocol stack and the second protocol stack, SDAPs, RLC protocols, MAC entities, and/or physical layers may be the same or different. In other implementations, the first protocol stack and the second protocol stack can share the same SDAP, and/or the same RLC protocol, and/or the same MAC entity, and/or the same physical layer, or have their respective SDAPs, RLCs, MAC entities, and physical layers.

The target network device in the implementation refers to the target network device to which the terminal device is ready to switch to connect. In another implementation, the target network device is an SN, and the source network device is an MN. It should be noted that in an LTE system, the SN is called an SCG, and in an NR system it is the SN, which refers to the same concept, that is, the SN is a second service network device in a DC scenario. In the implementation, applicable scenarios may include the following: the terminal device maintains the connection with the source network device and fails to connect to the target network device; the terminal device disconnects from the source network device and successfully connects to the target network device; and/or the terminal device fails to connect to an SCG and SCG connection change fails. Of course, there may also be other scenarios, for example, in a scenario where multiple SCGs are configured, fail to connect to one SCG, and in a scenario where multiple target cells are configured, fail to connect to one target cell. There may also be other applicable scenarios, which will not be exhaustively illustrated in the implementation.

Finally, the timing time of the first timer is explained as follows. The timing time of the first timer is the same as that of T310 or T312. In another implementation, the timing time of the first timer is related to average time taken for that the terminal device accesses the target network device.

The average time taken for that the terminal device accesses the target network device can be calculated based on only time taken for multiple accesses from the terminal device to different target network devices or the same target network device within a period of time. The period of time can be set according to actual conditions, for example, can be set to be 1 day or 10 days, etc., which will be not exhaustively illustrated herein. Of course, the average time taken for that the terminal device accesses the target network device can also be calculated based on time taken for the last N accesses from the terminal device to the target network device, for example, based on only the last 10 accesses from the terminal device to the target network device. The average time calculated can be used as the timing time of the first timer. In other implementations, a sum of the average time and M can be used as the timing time of the first timer, where M can be set according to the actual situations and can also be set to be a constant, which is not limited herein.

The first timer provided in the implementation may be a newly defined timer that is different from existing timers, for example, different from existing T310, T312, T304, and T307.

In addition, the first timer may be T310 or T312, and what is needed is to adjust T310 or T312. At present, timing of T310 and 312 are illustrated in the following table.

| Timer | Start | Stop | Expire |
|---|---|---|---|
| T312 | Receive a measurement report; and T310 is run. | Receive lower layer synchronous indications successively; receive an HO command; trigger a connection re-establishment procedure; and T310 expires. | Return to idle status; and perform connection re-establishment. |
| T310 | Receive physical-layer | Receive physical-layer synchronous indications successively; | Perform RRC connection re-establishment; and return to idle status. |

-continued

| Timer | Start | Stop | Expire |
|---|---|---|---|
| | asynchronous indications successively. | receive an HO command; and trigger a connection re-establishment procedure | |

The above T310 or T312 subjected to an operation of modifying the stopping condition can be used as the first timer in the implementation. For example, by removing the stopping condition of "receive an HO command" in the above table, T310 or T312 can be used as the aforementioned first timer in the implementation.

Furthermore, what needs to be illustrated is that based on the adjusted T310 or T312, the first timer is not interrupted upon reception of the HO command. In addition, based on the adjusted T310 or T312, the first timer can be re-started upon reception of the HO command.

It can be seen that by adopting the above solution, the first timer for the terminal device can be configured. When the terminal device performs a handover connection to connect to the target network device, the terminal device still maintains the connection with the source network device. At this point, monitor the source network device based on the first timer. In this way, while maintaining dual connection, i.e., the connection between the terminal device and the source network device and the connection between the terminal device and the target network device, the first timer for the terminal device can be provided to monitor the source network device, thereby ensuring that the solution can be applied to various processing scenarios.

Third Implementation

FIG. 5 illustrates a terminal device according to an implementation of the present disclosure. The terminal device includes a first communication unit 51 configured to obtain a first timer of a source network device, and a first processing unit 52 configured to monitor the source network device based on the first timer of the source network device, in response to the terminal device connecting to a target network device.

The first processing unit 52 is configured to perform one of the following. In response to a starting condition of the first timer being met, start the first timer of the source network device. In response to a stopping condition of the first timer being met, stop the first timer of the source network device. In response to elapse of timing time of the first timer, the first timer of the source network device expires.

What needs to be illustrated is that during the terminal device connecting to the target network device, the first processing unit 52 can further control the first communication unit 51 to maintain a connection between the terminal device and the source network device.

The starting condition of the first timer includes one of: reception of an HO command for the target network device or reception of a physical-layer asynchronous indication.

In an implementation, in response to reception of the HO command, start the first timer. At this point, T312 and T310 can be run.

In an implementation, in response to reception of one physical-layer asynchronous indication or at least two physical-layer asynchronous indications, determine to start the first timer. For example, when one physical-layer asynchronous indication is received, determine to start the first timer.

In other implementations, when at least two physical-layer asynchronous indications are successively received, that is to say, when at least two physical-layer asynchronous indications are successively received within a certain time, determine to start the first timer. It can also be understood that it is also possible to set a threshold for the number of physical-layer asynchronous indications successively received. For example, it can be set that start the first timer when eight physical-layer asynchronous indications are successively received, and other numbers can be set, which will be not exhaustively illustrated herein. For example, when multiple physical-layer asynchronous instructions are successively received, start the timer. At this point, T312 and T310 may not be run. The certain time can be set according to actual conditions, for example, the certain time can be 40 ms or other values, and can be determined according to network conditions or current network load, which is not limited herein.

The HO command can be transmitted by the source network device. In addition, when multiple physical-layer asynchronous indications are successively received, it can be considered that the current network connection is relatively poor.

The stopping condition of the first timer includes one of: reception of a physical-layer synchronous indication, the terminal device connecting to the target network device successfully, releasing the connection between the terminal device and the source network device, or reception of a network indication of releasing the connection between the terminal device and the source network device.

When one physical-layer synchronous indication or at least two physical-layer synchronous indications are received, determine to stop the first timer. For example, when one physical-layer synchronous indication is received, determine to stop the first timer.

In can be considered that at least two physical-layer synchronous indications refer to at least two physical-layer synchronous indications successively received, that is to say, at least two physical-layer synchronous indications are successively received within a certain time. It can also be understood that it is also possible to set a threshold for the number of physical-layer synchronous indications successively received. For example, it can be set that stop the first timer when eight physical-layer synchronous indications are successively received, and other numbers can be set, which will be not exhaustively illustrated herein. When multiple physical-layer synchronous indications are successively received, it can be considered that quality of signals between the terminal device and the target network device is relatively high. The certain time can be set according to actual conditions, for example, the certain time can be 40 ms or other values, and can be determined according to network conditions or current network load, which is not limited herein.

In addition, a time point at which the terminal device successfully connects to the target network device and a time point at which the terminal device releases the connection with the source network device may be the same or different, that is, when the terminal device successfully connects to the target network device, the first timer can be controlled to stop, and at this point, stop monitoring the source network device, or when it is determined to release the connection between the terminal device and the source network device, the first timer can be stopped, that is, stop monitoring the source network device. When the two time points are different, it may be that the time point at which the terminal device releases the connection with the source network device is later than the time point at which the terminal device successfully connects to the target network device, which can be understood as after the terminal device successfully connects to the target network device, release the connection with the source network device.

Furthermore, reception of the network indication of releasing the connection with the source network device may refer to reception of a connection-release indication from the target network device, or reception of a connection-release indication from a network side. At this point, the first timer of the source network device can be stopped.

What needs to be pointed out is that monitoring the source network device may refer to detecting quality of signals from the source network device. With the first timer, time taken for monitoring the source network device can be controlled.

The first processing unit 52 is further configured to perform one of the following. The terminal device initiates RRC connection re-establishment. The terminal device returns to idle status. The terminal device disconnects from the network device.

In an implementation, when the first timer expires, it can be considered that the terminal device unsuccessfully connects to the target network device. At this point, the RRC connection re-establishment can be performed. At this point, the terminal device does not need to establish the connection with the source network device, and can establish a connection with other network devices, which will not be exhaustively illustrated herein. In other implementations, at this point, the terminal device returns to the idle status, or directly disconnects from the source network device. In addition, before the first timer expires, the terminal device can attempt to connect to the target network device multiple times, and in case that the terminal device successfully connects to the target network device every time, perform the aforementioned processing when the first timer expires.

Based on the foregoing solution, in the implementation, the first communication unit 51 obtaining the first timer of the source network device is that the first communication unit 51 obtains the first timer configured by the network side.

The network side can configure the first timer for the terminal device through RRC signaling and system messages. The network side configuring the first timer for the terminal device can be that the network side (such as E-UTRA) or the network device (such as the source network device) configures the first timer for the terminal device.

In other implementations, the first timer can be obtained from the HO command, that is, the terminal device receives the HO command from the network side and obtains the first timer from information carried in the HO command.

The HO command can be transmitted by the source network device. In this scenario, the terminal device receives the HO command from the source network device, and obtains the first timer from a reconfiguration message carried in the HO command.

FIG. 3 illustrates HO command transmission and information interaction during a handover process.

A handover preparation phase includes operations at steps 1-6 in FIG. 3. The source network device transmits measurement control to the terminal device. After the terminal device performs measurement on multiple network devices or cells, the terminal device transmits a measurement report to the source network device. The source network device determines a handover decision according to the measurement report (or combined with radio resource management (RRM) information). The source network device transmits a handover request to the target network device to enable the target network device to be ready to perform handover. The target network device performs handover permission control according to the handover request. When the target network device determines to perform handover, the target network device transmits a handover request confirmation to the source network device.

Then proceed to a handover execution phase, including operations at steps 7-11 in FIG. 3. The target network device generates RRC information, transmits the RRC connection reconfiguration information to the source network device, and the source network device transmits the RRC connection reconfiguration information to the terminal device. Upon reception of the RRC connection reconfiguration information, the terminal device performs handover processing according to the RRC connection reconfiguration information. The source network device then transmits a sequence number (SN) status transfer message to the target network device. The terminal device synchronizes with the target network device, receives a UL assignment message from the target network device, and transmits an RRC connection reconfiguration completion message to the target network device.

Finally, enter a handover completion stage, including operations at steps 12-18 in FIG. 3. The target network device transmits a path handover request to an MME to notify the MME terminal equipment to perform cell change. The MME transmits a bearer adjustment request to a service gateway, and the service gateway performs a downlink path handover processing. After the service gateway completes the processing, the service gateway transmits a bearer adjustment completion message to the MME, and the MME transmits a confirmation message for the path handover request to the target network device. The target network device notifies the source network device of terminal device context release and the source network device releases resources.

Further, in the implementation, the terminal device retains the connection with the source network device. The terminal device retains a first protocol stack and a first related key between the terminal device and the source network device, and maintains a second protocol stack and a second related key between the terminal device and the target network device. The first related key is different from the second related key. The second related key can be generated according to the first related key.

The first protocol stack and the second protocol stack may be the same or different, or at least partially different. For example, for a 5G system, an SDAP), a PDCP, an RLC protocol, an MAC entity, and a lower layer entity maintained between the terminal device and the source network device may be different from those maintained between the terminal device and the target network device. For a 4G system, a PDCP, an RLC protocol, an MAC entity, and a lower layer entity maintained between the terminal device and the source network device may be different from those maintained between the terminal device and the target network device. In addition, according to the technical solution in the implementation, to ensure usage of different keys, the PDCP in the first protocol stack needs to be different from the PDCP in the second protocol stack. In the first protocol stack and the second protocol stack, SDAPs, RLC protocols, MAC entities, and/or physical layers may be the same or different. In other implementations, the first protocol stack and the second protocol stack can share the same SDAP, and/or the same RLC protocol, and/or the same MAC entity, and/or the same physical layer, or have their respective SDAPs, RLCs, MAC entities, and physical layers.

The target network device in the implementation refers to the target network device to which the terminal device is ready to switch to connect. In another implementation, the target network device is an SN, and the source network device is a master node MN. It should be noted that in an LTE system, the SN is called an SCG, and in an NR system it is the SN, which refers to the same concept, that is, the SN is a second service network device in a DC scenario. In the implementation, applicable scenarios may include the following: the terminal device maintains the connection with the source network device and fails to connect to the target network device; the terminal device disconnects from the source network device and successfully connects to the target network device; and/or the terminal device fails to connect to an SCG and SCG connection change fails. Of course, there may also be other scenarios, for example, in a scenario where multiple SCGs are configured, fail to connect to one SCG, and in a scenario where multiple target cells are configured, fail to connect to one target cell. There may also be other applicable scenarios, which will not be exhaustively illustrated in the implementation.

Finally, the timing time of the first timer is explained as follows. The timing time of the first timer is the same as that of T310 or T312. In another implementation, the timing time of the first timer is related to average time taken for that the terminal device accesses the target network device.

The average time taken for that the terminal device accesses the target network device can be calculated based on only time taken for multiple accesses from the terminal device to different target network devices or the same target network device within a period of time. The period of time can be set according to actual conditions, for example, can set to be 1 day or 10 days, etc., which will be not exhaustively illustrated herein. Of course, the average time taken for that the terminal device accesses the target network device can also be calculated based on only time taken for the last N accesses from the terminal device to the target network device, for example, based on only the last 10 accesses from the terminal device to the target network device. The average time calculated can be used as the timing time of the first timer. In other implementations, a sum of the average time and M can be used as the timing time of the first timer, where M can be set according to the actual situations and can also be set to be a constant, which is not limited herein.

The first timer provided in the implementation may be a newly defined timer that is different from existing timers, for example, different from existing T310, T312, T304, and T307.

In addition, the first timer may be T310 or T312, and what is needed is to adjust T310 or T312. At present, timing of T310 and 312 are illustrated in the following table.

| Timer | Start | Stop | Expire |
|---|---|---|---|
| T312 | Receive a measurement report; and T310 is run. | Receive lower layer synchronous indications successively; receive an HO command; trigger a connection re-establishment procedure; and T310 expires | Return to idle status; and perform connection re-establishment. |
| T310 | Receive physical-layer asynchronous indications | Receive physical-layer synchronous indications successively; receive an HO command; and | Perform RRC connection re-establishment; and return to idle status. |

| Timer | Start | Stop | Expire |
|---|---|---|---|
| | successively. | trigger a connection re-establishment procedure. | |

The above T310 or T312 subjected to an operation of modifying the stopping condition can be used as the first timer in the implementation. For example, by removing the stopping condition of "receive an HO command" in the above table, T310 or T312 can be used as the aforementioned first timer in the implementation.

Furthermore, what needs to be illustrated is that based on the adjusted T310 or T312, the first timer is not interrupted upon reception of the HO command. In addition, based on the adjusted T310 or T312, the first timer can be re-started upon reception of the HO command.

It can be seen that by adopting the above solution, the first timer for the terminal device can be configured. When the terminal device performs a handover connection to connect to the target network device, the terminal device still maintains the connection with the source network device. At this point, monitor the source network device based on the first timer. In this way, while maintaining dual connection, i.e., the connection between the terminal device and the source network device and the connection between the terminal device and the target network device, the first timer for the terminal device can be provided to monitor the source network device, thereby ensuring that the solution can be applied to various processing scenarios.

Fourth Implementation

FIG. 6 illustrates a source network device according to an implementation of the present disclosure. The source network device includes a second communication unit 61 configured to configure, for a terminal device, a first timer of the source network device, and a second processing unit 62 configured to maintain the connection between the source network device and the terminal device, in response to connecting the terminal device to the target network device.

A starting condition of the first timer includes one of: reception of an HO command for the target network device or reception of a physical-layer asynchronous indication.

In an implementation, in response to reception of the HO command, start the first timer. At this point, T312 and T310 can be run.

The first timer can be configured for the terminal device through RRC signaling and system messages. The network side configuring the first timer for the terminal device can be that the network side (such as evolved universal terrestrial radio access (E-UTRA)) or the network device (such as the source network device) configures the first timer for the terminal device.

In other implementations, the first timer can be obtained from the HO command, that is, the terminal device receives the HO command from the network side, and obtains the first timer from information carried in the HO command.

The HO command can be transmitted by the source network device. In this scenario, the terminal device can receive the HO command from the source network device, and obtain the first timer from a reconfiguration message in the HO command.

FIG. 3 illustrates HO command transmission and information interaction during a handover process.

A handover preparation phase includes operations at steps 1-6 in FIG. 3. The source network device transmits measurement control to the terminal device. After the terminal device performs measurement on multiple network devices or cells, the terminal device transmits a measurement report to the source network device. The source network device determines a handover decision according to the measurement report (or combined with RRM information). The source network device transmits a handover request to the target network device to enable the target network device to be ready to perform handover. The target network device performs handover permission control according to the handover request. When the target network device determines to perform handover, the target network device transmits a handover request confirmation to the source network device.

Then proceed to a handover execution phase, including operations at steps 7-11 in FIG. 3. The target network device generates RRC information, transmits the RRC connection reconfiguration information to the source network device, and the source network device transmits the RRC connection reconfiguration information to the terminal device. Upon reception of the RRC connection reconfiguration information, the terminal device performs handover processing according to the RRC connection reconfiguration information. The source network device then transmits an SN status transfer message to the target network device. The terminal device synchronizes with the target network device, receives a UL assignment message from the target network device, and transmits an RRC connection reconfiguration completion message to the target network device.

Finally, enter a handover completion stage, including operations at steps 12-18 in FIG. 3. The target network device transmits a path handover request to an MME to notify the MME terminal equipment to perform cell change. The MME transmits a bearer adjustment request to a service gateway, and the service gateway performs a downlink path handover processing. After the service gateway completes the processing, the service gateway transmits a bearer adjustment completion message to the MME, and the MME transmits a confirmation message for the path handover request to the target network device. The target network device notifies the source network device of terminal device context release and the source network device releases resources.

Further, in the implementation, the terminal device retains the connection with the source network device. The terminal device retains a first protocol stack and a first related key between the terminal device and the source network device, and maintains a second protocol stack and a second related key between the terminal device and the target network device. The first related key is different from the second related key. The second related key can be generated according to the first related key.

The first protocol stack and the second protocol stack may be the same or different, or at least partially different. For example, for a 5G system, an SDAP, a PDCP, an RLC protocol, an MAC entity, and a lower layer entity maintained between the terminal device and the source network device may be different from those maintained between the terminal device and the target network device. For a 4G system, a PDCP, an RLC protocol, an MAC entity, and a lower layer entity maintained between the terminal device and the source network device may be different from those maintained between the terminal device and the target network device. In addition, according to the technical solution in the implementation, to ensure usage of different keys, the PDCP in the first protocol stack needs to be different from the PDCP in the second protocol stack. In the first protocol stack and the second protocol stack, SDAPs, RLC protocols, MAC entities, and/or physical layers may be the same or different. In other implementations, the first protocol stack and the second protocol stack can share the same SDAP, and/or the same RLC protocol, and/or the same MAC entity, and/or the same physical layer, or have their respective SDAPs, RLCs, MAC entities, and physical layers.

The target network device in the implementation refers to the target network device to which the terminal device is ready to switch to connect. In another implementation, the target network device is an SN, and the source network device is an MN. It should be noted that in an LTE system, the SN is called an SCG, and in an NR system it is the SN, which refers to the same concept, that is, the SN is a second service network device in a DC scenario. In the implementation, applicable scenarios may include the following: the terminal device maintains the connection with the source network device and fails to connect to the target network device; the terminal device disconnects from the source network device and successfully connects to the target network device; and/or the terminal device fails to connect to an SCG and SCG connection change fails. Of course, there may also be other scenarios, for example, in a scenario where multiple SCGs are configured, fail to connect to one SCG, and in a scenario where multiple target cells are configured, fail to connect to one target cell. There may also be other applicable scenarios, which will not be exhaustively illustrated in the implementation.

Finally, the timing time of the first timer is explained as follows. The timing time of the first timer is the same as that of T310 or T312. In another implementation, the timing time of the first timer is related to average time taken for that the terminal device accesses the target network device.

The average time taken for that the terminal device accesses the target network device can be calculated based on only time taken for multiple accesses from the terminal device to different target network devices or the same target network device within a period of time. The period of time can be set according to actual conditions, for example, can set to be 1 day or 10 days, etc., which will be not exhaustively illustrated herein. Of course, the average time taken for that the terminal device accesses the target network device can also be calculated based on only time taken for the last N accesses from the terminal device to the target network device, for example, based on only the last 10 accesses from the terminal device to the target network device. The average time calculated can be used as the timing time of the first timer. In other implementations, a sum of the average time and M can be used as the timing time of the first timer, where M can be set according to the actual situations and can also be set to be a constant, which is not limited herein.

The first timer provided in the implementation may be a newly defined timer that is different from existing timers, for example, different from existing T310, T312, T304, and T307.

In addition, the first timer may be T310 or T312, and what is needed is to adjust T310 or T312. At present, timing of T310 and 312 are illustrated in the following table.

| Timer | Start | Stop | Expire |
|---|---|---|---|
| T312 | Receive a measurement report; and T310 is run. | Receive lower layer synchronous indications successively; receive an HO command; trigger a connection re-establishment procedure; and T310 expires | Return to idle status; and perform connection re-establishment. |
| T310 | Receive physical-layer asynchronous indications successively. | Receive physical-layer synchronous indications successively; receive an HO command; and trigger a connection re-establishment procedure | Perform RRC connection re-establishment; and return to idle status. |

The above T310 or T312 subjected to an operation of modifying the stopping condition can be used as the first timer in the implementation. For example, by removing the stopping condition of "receive an HO command" in the above table, T310 or T312 can be used as the aforementioned first timer in the implementation.

Furthermore, what needs to be illustrated is that based on the adjusted T310 or T312, the first timer is not interrupted upon reception of the HO command. In addition, based on the adjusted T310 or T312, the first timer can be re-started upon reception of the HO command.

It can be seen that by adopting the above solution, the first timer for terminal device can be configured. When the terminal device performs a handover connection to connect to the target network device, the terminal device still maintains the connection with the source network device. At this point, monitor the source network device based on the first timer. In this way, while maintaining dual connection, i.e., the connection between the terminal device and the source network device and the connection between the terminal device and the target network device, the first timer for the terminal device can be provided to monitor the source network device, thereby ensuring that the solution can be applied to various processing scenarios.

Figure 7:
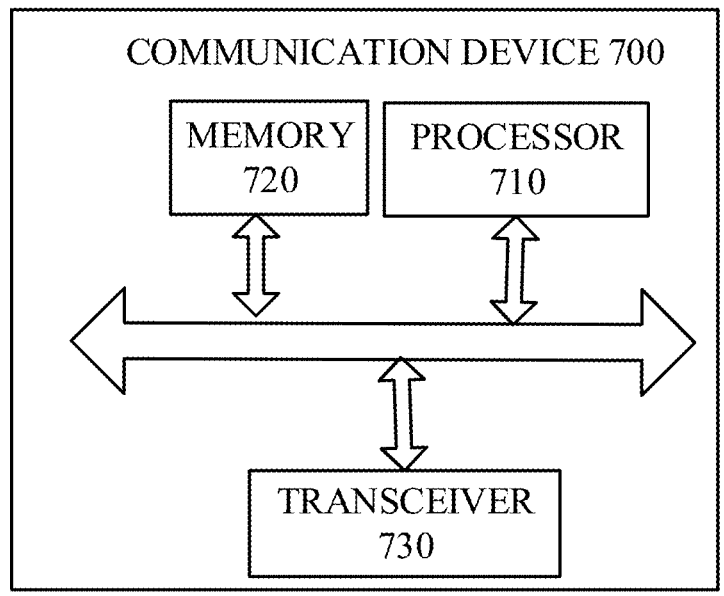
FIG. 7 is a schematic structural diagram illustrating a communication device according to an implementation of the present disclosure.

FIG. 7 is a schematic structural view illustrating a communication device 700 according to an implementation of the present disclosure. The communication device 700 may be the aforementioned terminal device or network device. The communication device 700 illustrated in FIG. 7 includes a processor 710. The processor 710 can invoke and run at least one computer program in a memory to implement the method in the implementation of the present disclosure.

In an implementation, as illustrated in FIG. 7, the communication device 700 further includes a memory 720. The processor 710 can invoke and run the computer program in the memory 720 to implement the method in the implementation of the present disclosure.

The memory 720 may be a single device independent of the processor 710, and may also be integrated in the processor 710.

In an implementation, as illustrated in FIG. 7, the communication device 700 may further include a transceiver 730. The processor 710 can control the transceiver 730 to communication with other devices, for example, to transmit information or data to the other devices or receive information or data from the other devices.

In an implementation, the transceiver 730 may include a transmitter and a receiver. The transceiver 730 may further include one or more antennas.

The communication device 700 may be the network device in the implementations of the present disclosure, and the communication device 700 can implement corresponding procedures realized by the network device in the methods in the implementations of the present disclosure, which will not be repeated herein for simplicity.

The communication device 700 may be the terminal device or network device in the implementations of the present disclosure, and the communication device 700 can implement corresponding procedures realized by the mobile terminal/terminal device in the implementations of the present disclosure, which will not be repeated herein for simplicity.

Figure 8:
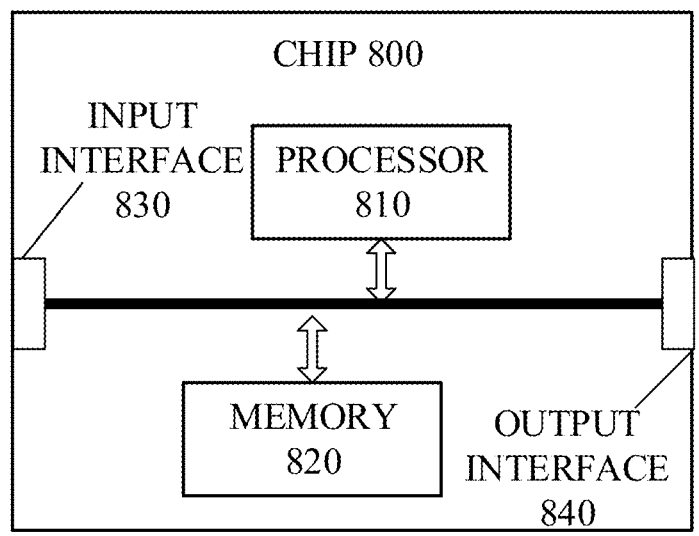
FIG. 8 is a schematic block diagram illustrating a chip according to an implementation of the present disclosure.

FIG. 8 is a schematic structural diagram illustrating a chip according to an implementation of the present disclosure. The chip 800 illustrated in FIG. 8 includes a processor 810. The processor 810 can invoke and run at least one computer program stored in a memory to implement the methods in the implementation of the present disclosure.

In an implementation, as illustrated in FIG. 8, the chip 800 further includes a memory 820. The processor 810 can invoke and run at least one computer program stored in the memory 820 to implement the methods in the implementations of the present disclosure.

The memory 820 may be a single device independent of the processor 810, and may also be integrated in the processor 810.

In an implementation, the chip 800 may further include an input interface 830. The processor 810 can control the input interface 830 to communication with other devices or chips, for example, to receive information or data from the other devices or chips.

In an implementation, the chip 800 may further include an output interface 840. The processor 810 can control the output interface 840 to communication with other devices or chips, for example, to output information or data to the other devices or chips.

The chip can be applied to the network device in the implementations of the present disclosure, and the chip can implement corresponding procedures realized by the network device in the methods in the implementations of the present disclosure, which will not be repeated herein for simplicity.

The chip can be applied to the mobile terminal in the implementations of the present disclosure, and the chip can implement corresponding procedures realized by the mobile terminal in the methods in the implementations of the present disclosure, which will not be repeated herein for simplicity.

It is to be understood that the chip referred in the implementation of the present disclosure may also be referred to as a system-level chip, a system chip, a chip system, a system-on chip, or the like.

Figure 9:
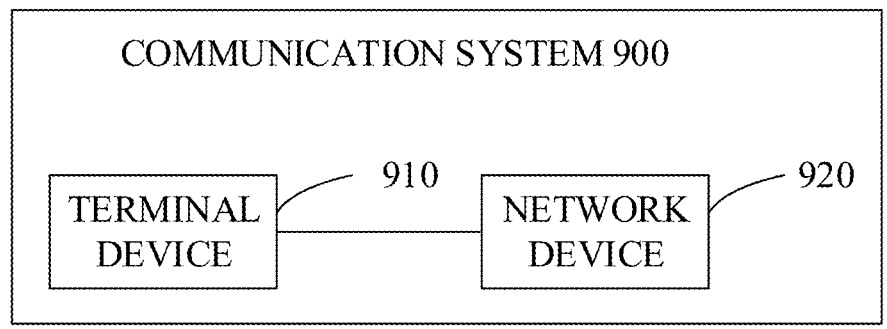
FIG. 9 is a schematic diagram illustrating a communication system architecture according to an implementation of the present disclosure.

FIG. 9 is a schematic block diagram illustrating a communication system 900 according to an implementation of the present disclosure. As illustrated in FIG. 9, the communication system 900 includes a terminal device 910 and a network device 920.

The terminal device 910 can be used to implement corresponding functions realized by the terminal device in the above method, and the network device 920 can be used to implement corresponding functions realized by the network device in the above method, which will not be repeated herein for simplicity.

It is to be understood that the processor in the implementation of the present disclosure may be an integrated circuit chip with signal processing capability. In the implementation process, the steps of the foregoing method implementations can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA) or other programming logic devices, discrete gates or transistor logic devices, or discrete hardware components. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure can be directly executed and completed by a hardware decoding processor, or executed and completed by a combination of hardware and software modules in the decoding processor. The software modules can be located in a mature storage medium in the field such as a random access memory, a flash memory, a read-only memory, a programmable read-only memory, an electrically erasable programmable memory, or a register. The storage medium is located in the memory, and the processor reads information in the memory and completes the steps of the above methods in combination with its hardware.

It can be understood that the memory may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used for external high-speed cache. By way of examples rather than limitation, various random access memories can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It is to be noted that the memory described in this specification is intended to include but is not limited to these and any other suitable types of memories.

It is to be noted that the above memories are exemplary but not used for limitation. For example, the memory in the implementation of the present disclosure may also be an SRAM, a DRAM, an SDRAM, a DDR SDRAM, an ESDRAM, an SLDRAM, and a DR RAM. That is, the memory described in the implementation of the present disclosure is intended to include but is not limited to these and any other suitable types of memories.

Implementations of the present disclosure further provide a computer-readable storage medium configured to store at least one computer program.

In an implementation, the computer-readable storage medium can be applied to the network device in the implementations of the present disclosure, and the computer program enables a computer to execute corresponding procedures realized by the network device in the above methods in the implementations of the present disclosure, which will not be repeated herein for simplicity.

In an implementation, the computer-readable storage medium can be applied to the terminal device in the implementations of the present disclosure, and the computer program enables the computer to execute corresponding procedures realized by the mobile terminal/terminal device in the above methods in the implementations of the present disclosure, which will not be repeated herein for simplicity.

Implementations of the present disclosure further provide a computer program product which includes at least one computer program instruction.

In an implementation, the computer program product can be applied to the network device in the implementations of the present disclosure, and the computer program instruction enables the computer to execute corresponding procedures realized by the network device in the above methods in the implementations of the present disclosure, which will not be repeated herein for simplicity.

In an implementation, the computer program product can be applied to the mobile terminal/terminal device in the implementations of the present disclosure, and the computer program instruction enables the computer to execute corresponding procedures realized by the mobile terminal/terminal device in the above methods in the implementations of the present disclosure, which will not be repeated herein for simplicity.

Implementations of the present disclosure further provide a computer program.

In an implementation, the computer program can be applied to the network device in the implementations of the present disclosure, and the computer program, when run in the computer, enables the computer to execute corresponding procedures realized by the network device in the above methods in the implementations of the present disclosure, which will not be repeated herein for simplicity.

In an implementation, the computer program can be applied to the mobile terminal/terminal device in the implementations of the present disclosure, and the computer program, when run in the computer, enables the computer to execute corresponding procedures realized by the mobile terminal/terminal device in the above methods in the implementations of the present disclosure, which will not be repeated herein for simplicity.

Those of ordinary skill in the art will appreciate that units and algorithmic operations of various examples described in connection with the implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

According to the several implementations provided in the present disclosure, it will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical coupling, mechanical coupling, or the like.

Separated units as illustrated may or may not be physically separated. Components or parts displayed as units may or may not be physical units, and may reside at one location or may be distributed to multiple networked units. Some of or all the units may be selectively adopted according to practical needs to achieve objectives of the solutions of the present disclosure.

In addition, the functional units in the various implementations of the present disclosure may be integrated into one processing unit, or each unit may exist alone physically, or two or more units may be integrated into one unit.

If the integrated units are implemented as software functional units and sold or used as standalone products, they may be stored in a computer readable storage medium. Based on such an understanding, the essential technical solution, or the portion that contributes to the relate art, or part of the technical solution of the present disclosure may be embodied as software products. The computer software products can be stored in a storage medium and may include multiple instructions that, when executed, can cause a computing device, e.g., a personal computer, a server, a network device, etc., to execute some of or all operations of the methods described in various implementations of the present disclosure. The above storage medium may include various kinds of media that can store program codes, such as a universal serial bus (USB) flash disk, a mobile hard drive, an ROM, an RAM, an RAM, a magnetic disk, or an optical disk.

The above are only specific implementations of the present disclosure, and the protection scope of the present disclosure is not limited to this. Any person skilled in the art can easily think of changes or substitutions within the technical scope disclosed in the present disclosure, and these changes or substitutions shall fall within the protection scope of the present disclosure. Therefore, the protection scope of the present disclosure shall be subject to the protection scope of the claims.

What is claimed is:

1. A timer-based processing method, applied to a terminal device and comprising:
   obtaining a first timer of a source network device; and
   monitoring and maintaining a connection between the terminal device and the source network device based on the first timer of the source network device, in response to the terminal device connecting to a target network device;
   wherein the method further comprises:
   during monitoring the source network device based on the first timer of the source network device:
   starting the first timer of the source network device in response to a starting condition of the first timer being met;
   stopping the first timer of the source network device in response to a stopping condition of the first timer being met, wherein the stopping condition of the first timer comprises the terminal device connecting to the target network device successfully; and disconnecting from the source network device in response to expiry of the first timer corresponding to the source network device;
   wherein the starting condition of the first timer comprises one of:
   reception of a handover (HO) command for the target network device; or reception of a physical-layer asynchronous indication.

2. The method of claim 1, wherein the stopping condition of the first timer further comprises one of:
reception of a physical-layer synchronous indication;
releasing the connection between the terminal device and the source network device; or
reception of a network indication of releasing the connection between the terminal device and the source network device.

3. The method of claim 1, further comprising one of:
in response to expiry of the first timer of the source network device:
initiating, by the terminal device, radio resource control (RRC) connection re-establishment; or
returning to, by the terminal device, idle status.

4. The method of claim 1, wherein obtaining the first timer of the source network device comprises:
obtaining the first timer configured by a network side.

5. The method of claim 4, wherein obtaining the first timer configured by the network side comprises:
receiving an HO command from the network side; and
obtaining the first timer from information carried in the HO command.

6. The method of claim 1, wherein
the timing time of the first timer is the same as that of T310 or T312; or
the timing time of the first timer is related to average time taken for that the terminal device accesses the source network device.

7. A terminal device comprising:
at least one processor; and
a memory storing computer programs which, when executed by the at least one processor, cause the at least one processor to:
obtain a first timer of a source network device;
monitor and maintain a connection between the terminal device and the source network device based on the first timer of the source network device, in response to the terminal device connecting to a target network device; and
during monitoring the source network device based on the first timer of the source network device:
start the first timer of the source network device in response to a starting condition of the first timer being met;
stop the first timer of the source network device in response to a stopping condition of the first timer being met, wherein the stopping condition of the first timer comprises the terminal device connecting to the target network device successfully; and
disconnect from the source network device in response to expiry of the first timer corresponding to the source network device;
wherein the starting condition of the first timer comprises one of:
reception of a handover (HO) command for the target network device; or reception of a physical-layer asynchronous indication.

8. The terminal device of claim 7, wherein the stopping condition of the first timer comprises one of:
reception of a physical-layer synchronous indication;
releasing the connection between the terminal device and the source network device; or
reception of a network indication of releasing the connection between the terminal device and the source network device.

9. The terminal device of claim 7, wherein the computer programs further cause the at least one processor to:
in response to expiry of the first timer of the source network device:
initiate radio resource control (RRC) connection re-establishment; or
return to idle status.

10. The terminal device of claim 7, wherein the computer programs causing the at least one processor to obtain the first timer of the source network device cause the at least one processor to:
obtain the first timer configured by a network side.

11. The terminal device of claim 10, wherein the computer programs causing the at least one processor to obtain the first timer configured by the network side cause the at least one processor to:
receive an HO command from the network side; and
obtain the first timer from information carried in the HO command.

12. The terminal device of claim 7, wherein
the timing time of the first timer is the same as that of T310 or T312; or
the timing time of the first timer is related to average time taken for that the terminal device accesses the source network device.

13. A non-transitory computer-readable storage medium storing computer programs which, when executed by at least one processor, cause the at least one processor to:
obtain a first timer of a source network device;
monitor and maintain a connection between a terminal device and the source network device based on the first timer of the source network device, in response to the terminal device connecting to a target network device; and
during monitoring the source network device based on the first timer of the source network device;
start the first timer of the source network device in response to a starting condition of the first timer being met;
stop the first timer of the source network device in response to a stopping condition of the first timer being met, wherein the stopping condition of the first timer comprises the terminal device connecting to the target network device successfully; and
disconnect from the source network device in response to expiry of the first timer corresponding to the source network device;
wherein the starting condition of the first timer comprises one of:
reception of a handover (HO) command for the target network device; or reception of a physical-layer asynchronous indication.

14. The non-transitory computer-readable storage medium of claim 13, wherein the stopping condition of the first timer comprises one of:
reception of a physical-layer synchronous indication;
releasing the connection between the terminal device and the source network device; or
reception of a network indication of releasing the connection between the terminal device and the source network device.

* * * * *